(12) United States Patent
Paschmann et al.

(10) Patent No.: US 9,175,190 B2
(45) Date of Patent: Nov. 3, 2015

(54) METHOD FOR APPLYING ELONGATE STRIP TO DOOR FRAME OF VEHICLE

(75) Inventors: Volker Paschmann, Essen (DE); Siegfried K. Welke, Erkrath (DE); Klaus Malecki, Krefeld (DE); Detlef Richert, Erkelenz (DE)

(73) Assignee: 3M Innovative Properties Company, St. Paul, MN (US)

( * ) Notice: Subject to any disclaimer, the term of this patent is extended or adjusted under 35 U.S.C. 154(b) by 149 days.

(21) Appl. No.: 13/819,513

(22) PCT Filed: Aug. 26, 2011

(86) PCT No.: PCT/US2011/049261
§ 371 (c)(1),
(2), (4) Date: Feb. 27, 2013

(87) PCT Pub. No.: WO2012/030635
PCT Pub. Date: Mar. 8, 2012

(65) Prior Publication Data
US 2013/0153146 A1    Jun. 20, 2013

(30) Foreign Application Priority Data
Sep. 3, 2010 (EP) .................................. 10175313

(51) Int. Cl.
*C09J 5/00* (2006.01)
*B23P 19/04* (2006.01)
*C09J 7/02* (2006.01)

(52) U.S. Cl.
CPC ................ *C09J 5/00* (2013.01); *B23P 19/047* (2013.01); *C09J 7/0289* (2013.01);
(Continued)

(58) Field of Classification Search
CPC ....................................................... C09J 5/00

USPC ....................................................... 156/330.9
See application file for complete search history.

(56) References Cited

U.S. PATENT DOCUMENTS

| 4,181,752 A | 1/1980 | Martens et al. |
| 4,223,067 A | 9/1980 | Levens |

(Continued)

FOREIGN PATENT DOCUMENTS

| EP | 1 902 813 | 3/2008 |
| EP | 1902813 A1 * | 3/2008 |

(Continued)

OTHER PUBLICATIONS

VHB 4941 Product Data Sheet (provided by Applicant).*
(Continued)

*Primary Examiner* — Daniel Lee
(74) *Attorney, Agent, or Firm* — Dena M. Ehrich (57) ABSTRACT

There is provided a method of attaching an elongate strip to a door frame of the body of a vehicle comprising application of the elongate strip by means of a device comprising:
 i. a drive means;
 ii. an application head;
 iii. a stress control unit positioned between the drive means and application head and comprising one of more sensor units;
 iv. and a control unit for controlling the drive means,
the elongate strip comprises an adhesive tape comprising a foam layer having first and second major sides and a pressure sensitive adhesive layer associated with one of the major sides of the foam layer, the pressure sensitive adhesive comprising a cross-linked rubber and the foam layer comprises an acrylic polymer of one or more alkyl acrylates having an average of 3 to 14 carbon atoms in the alkyl group, the foam layer having a density of at least 540 kg/m$^3$.

16 Claims, 4 Drawing Sheets

(52) U.S. Cl.
CPC ....... *C09J 2201/134* (2013.01); *C09J 2201/36* (2013.01); *C09J 2201/606* (2013.01); *C09J 2201/61* (2013.01); *C09J 2421/00* (2013.01); *C09J 2433/00* (2013.01); *C09J 2433/006* (2013.01); *C09J 2453/00* (2013.01)

(56) References Cited

U.S. PATENT DOCUMENTS

| | | |
|---|---|---|
| 4,303,485 A | 12/1981 | Levens |
| 4,415,615 A | 11/1983 | Esmay et al. |
| 4,619,979 A | 10/1986 | Kotnour et al. |
| 4,833,179 A | 5/1989 | Young et al. |
| 4,843,134 A | 6/1989 | Kotnour et al. |
| 5,296,547 A | 3/1994 | Nestegard et al. |
| 5,382,451 A | 1/1995 | Johnson et al. |
| 5,637,646 A | 6/1997 | Ellis |
| 6,503,621 B1 | 1/2003 | Ma et al. |
| 6,804,610 B2 | 10/2004 | Morrow et al. |
| 2004/0229000 A1* | 11/2004 | Khandpur et al. ........... 428/41.3 |
| 2009/0301634 A1 | 12/2009 | Malecki et al. |
| 2010/0098962 A1 | 4/2010 | Hanley et al. |

FOREIGN PATENT DOCUMENTS

| | | |
|---|---|---|
| WO | WO 00/06637 | 2/2000 |
| WO | WO 2008/070386 | 6/2008 |

OTHER PUBLICATIONS

Handbook of Pressure Sensitive Adhesive Technology, D. Satas, $2^{nd}$ edition, p. 172-173 (1989).
PCT International Search Report from PCT/US2011/049261 dated Jan. 26, 2012, 4 pages.
VHB Conformable Acrylic Foam Tape 4941, Product Data Sheet, Sep. 2002, 2 pages.

* cited by examiner

METHOD FOR APPLYING ELONGATE STRIP TO DOOR FRAME OF VEHICLE

The present disclosure relates to the application of an elongate strip to the door frame of the body of a vehicle. In particular, the present disclosure relates to the application of an elongate strip that includes an adhesive tape.

Adhesives articles or adhesive tapes are commonly used to bond two substrates together to form a bonded composite. Particular adhesive tapes include those that have a foam layer. Such tapes or adhesive tapes are used for example in the automotive industry where they may be employed to bond various components to the body of a car or other motor vehicle. Typically they are used to bond such parts as emblems, plastic parts as well as rubber gaskets to doors. Examples of adhesive tapes are disclosed in for example WO 2008/070386, U.S. Pat. No. 6,503,621 and U.S. Pat. No. 4,415,615.

While a vast array of adhesives and tapes are available, advances in substrates and end use requirements continues to drive a need for new adhesive formulations and tape constructions. For example, developments in paints and coatings on automotive parts to which the adhesive tapes are to be bonded have proven to be particularly challenging. Likewise, there is a continuing trend in the transportation sector and in particular in the automotive industry to further reduce weight of, for example, cars in order to save on fuel consumption. This trend is leading to use and application of adhesive tapes where they have previously not been used or to the application of tapes in new configurations that are more demanding, for example, in stress-strain to which the adhesive tape may be subjected. As a particular example, rubber seals and gaskets are often applied around the frame of a door in the body of a vehicle by mechanical means such as clips, which add weight to the car. Replacing the mechanical attachment with an adhesive solution has proven difficult. In addition to performance properties, environmental regulations and processing costs also influence product formulation requirements.

Further, the assembly of vehicles such as cars and buses is highly automated and often involves the use of robots. Accordingly, application methods as disclosed in EP 1 902 813 have been proposed for the application of elongate strips on doors or door frames of vehicles. The device and method disclosed in this EP application have been found to produce excellent results when applying a rubber gasket using an adhesive tape around a door as the stress introduced in the adhesive tape is mitigated by measuring and controlling the stress on application. In particular, the method avoids introducing strain in the adhesive tape in a direction perpendicular to the plane of attachment of the tape.

It has been found that the application, when used to apply a seal on the frame of a door on the body of the vehicle, may still lead to detachment of the adhesive tape after some time. In particular, it was found that in areas of strong curvature of the door frame, for example at the corners of the door frame, detachment takes place because of the strain introduced in the adhesive tape within the plane parallel with the surface to which the tape is attached.

It would thus be desirable to find a method leading to reliable and good application of an adhesive tape to the frame of the door on the body of the vehicle and in particular a method that solves the problem of detachment in areas of strong curvature.

The present disclosure provides a method of attaching an elongate strip to a door frame of the body of a vehicle, the method comprising application of the elongate strip by means of a device comprising:

i. a drive means;
    ii. an application head;
    iii. a stress control unit positioned between the drive means and application head and comprising one of more sensor units;
    iv. and a control unit for controlling the drive means, the application of the elongate strip comprising advancing the elongate strip by the drive means, positioning, pressing and/or rolling the elongate strip on the door frame by means of the application head and controlling stress of the elongate strip by means of the stress control unit and the control unit for controlling the drive means, whereby the one or more sensor units of the stress control unit measure the stress of the elongate strip and the control unit controls the drive means to maintain the stress of the elongate strip within a desired range of stress based on the measurement of the stress of the elongate strip by the one or more sensors of the stress control unit, wherein the elongate strip comprises an adhesive tape comprising a foam layer having first and second major sides and a pressure sensitive adhesive layer associated with one of the major sides of the foam layer, the pressure sensitive adhesive comprising a cross-linked rubber and the foam layer comprises an acrylic polymer of one or more alkyl acrylates having an average of 3 to 14 carbon atoms in the alkyl group, the foam layer having a density of at least 540 kg/m$^3$.

The term "associated with" as used herein means that the relevant layer is provided directly on the surface or indirectly through the intermediary of one or more layers such as primer layers for example.

It has been found that the method in accordance with the present disclosure provides good results when attaching an adhesive tape to the frame of a door on the body of a vehicle. In particular, the adhesive tape adheres well also in areas of strong curvature such as at corners in the frame. Further, the method can be used to attach a variety of different rubber gaskets of different designs while allowing reliable attachments.

The following is a summary of embodiments according to the invention:

1. Method of attaching an elongate strip to a door frame of the body of a vehicle, the method comprising application of the elongate strip by means of a device comprising:

v. a drive means;
    vi. an application head;
    vii. a stress control unit positioned between the drive means and application head and comprising one of more sensor units;
    viii. and a control unit for controlling the drive means, the application of the elongate strip comprising advancing the elongate strip by the drive means, positioning, pressing and/or rolling the elongate strip on the door frame by means of the application head and controlling stress of the elongate strip by means of the stress control unit and the control unit for controlling the drive means, whereby the one or more sensor units of the stress control unit measure the stress of the elongate strip and the control unit controls the drive means to maintain the stress of the elongate strip within a desired range of stress based on the measurement of the stress of the elongate strip by the one or more sensors of the stress control unit, wherein the elongate strip comprises an adhesive tape comprising a foam layer having first and second major sides and a pressure sensitive adhesive layer associated with one of the major sides of the foam layer, the pressure sensitive adhesive comprising a cross-linked rubber and the foam layer comprises an acrylic polymer of one or more alkyl acrylates having an average of 3 to 14 carbon atoms in the alkyl group, the foam layer having a density of at least 540 kg/m$^3$.

2. Method according to embodiment 1 wherein the control unit for controlling the drive means controls the drive means so as to maintain the level of elongation of the elongate strip between 0 and 3%.

3. Method according to any of the previous embodiments wherein the acrylic polymer is a polymer obtainable by polymerization of a polymerizable composition comprising one or more alkyl acrylates having an average of 3 to 14 carbon atoms in the alkyl group and one or more polar monomers and optionally one or more multifunctional monomers having at least two free radical polymerizable groups.

4. Method according to embodiment 3 wherein the polymerizable composition comprises 83 to 97% by weight of the alkyl acrylates, 3 to 17% of the polar monomers and when present, between 0.01 and 1% by weight of the multi-functional monomers.

5. Method according to any of the previous embodiments, wherein the foam comprises a frothed foam.

6. Method according to embodiment 5, further comprising one or more hollow microspheres.

7. Method according to any of embodiments 1 to 4 wherein the foam comprises one or more hollow microspheres at least part of which comprise microspheres obtainable from expandable microspheres.

8. Method according to any of the previous embodiments wherein the foam layer further comprises a thixotropic agent.

9. Method according to any of the previous embodiments wherein the thixotropic agent comprises fumed silica.

10. Method according to any of the previous embodiments wherein said pressure sensitive adhesive layer comprises an acrylic pressure sensitive adhesive component.

11. Method according to any of the previous embodiments wherein said acrylic pressure sensitive adhesive component comprises an acrylic polymer having repeating units derived from one or more alkyl acrylates having 3 to 14 carbon atoms in the alkyl group and one or more polar monomers.

12. Method according to any of the previous embodiments wherein said polar monomers are selected from the group consisting of acrylic acids, itaconic acid, acrylamides, acrylonitrile, N-vinylpyrrolidone, N-vinyl caprolactam and combinations thereof.

13. Method according to any of the previous embodiments wherein the cross-linked rubber comprises a cross-linked block copolymer having a rubbery block and a glassy block.

14. Method according to embodiment 13 wherein said rubbery block comprises a first polymerized conjugated diene, a hydrogenated derivative thereof, or combinations thereof and wherein said glassy block comprises a monovinyl aromatic monomer.

15. Method according to embodiment 13 or 14 wherein said pressure sensitive adhesive layer comprises 30 to 50 parts by weight based on the total weight of the pressure sensitive adhesive layer, of said block copolymer and from 0.1 to 10 parts by weight based on the total weight of the pressure sensitive adhesive layer, of said acrylic pressure sensitive adhesive component.

16. Method according to embodiment 13 or 14 wherein said pressure sensitive adhesive layer comprises 10 to 20 parts by weight based on the total weight of the pressure sensitive adhesive layer, of said block copolymer and from 40 to 60 parts by weight based on the total weight of the pressure sensitive adhesive layer, of said acrylic pressure sensitive adhesive component.

17. Method according to any of the previous embodiments wherein said adhesive tape has said pressure sensitive adhesive layer associated with said first major side and wherein said second major side has a further adhesive layer associated with it.

18. Method according to embodiment 17 wherein said further adhesive layer comprises a pressure sensitive adhesive component or a heat activatable adhesive component.

19. Method according to any of the previous embodiments wherein the thickness of said foam layer is between 0.3 mm and 2 mm and wherein the weight per area of said pressure sensitive adhesive layer is between 40 $g/m^2$ and 100 $g/m^2$.

20. Method according to any of embodiments 17, 18 or 19 wherein said elongate strip further comprises a rubber gasket and wherein said rubber gasket is attached to said adhesive tape through said further adhesive layer.

21. Method according to any of the previous embodiments, wherein the elongate strip includes machine readable data and wherein the device further includes means for reading the machine readable data and whereby the desired stress range is set based on the readout of the machine readable data.

22. Method according to embodiment 21 wherein the machine readable data comprise a bar code.

23. Method according to embodiment 21 or 22 wherein the machine readable data comprises an identification code and wherein the device includes storage means comprising data relating the identification code to a desired stress range setting or wherein the device includes communication means for retrieving a desired stress range setting corresponding to the identification code.

24. Method according to embodiment 21 or 22 wherein the machine readable data comprises the desired range setting applicable for the elongate strip.

25. Method according to any of the previous embodiments wherein the density of the foam layer is at least 570 $kg/m^3$.

26. Method according to any of the previous embodiments, wherein the drive unit is a belt drive means.

27. Method embodiment 26, wherein the drive means comprises two drive means arranged on opposite sides of the elongate strip.

28. Method according to embodiment 1, 26, or 27, wherein the application unit is a pin roller.

29. Method according to any one of the previous embodiments, wherein the application unit is driven or freely rotating and/or wherein the application unit has an adjustable torque.

30. Method according to any one of the previous embodiments, wherein the application unit is suitable for furnishing a defined stress in the elongate strip.

31. Method according to any one of the previous embodiments, wherein the stress control unit further measures a parameter (ePR) of the application unit and controls the drive means also based on this measured parameter (ePR).

32. Method according to any one of the previous embodiments, wherein the sensor unit is a displacement transducer sensing a displacement of the elongate strip due to its state of stress.

33. Method according to any one of the previous embodiments, wherein the sensor unit is a sensor for detecting an angular position.

34. Method according to any one of the previous embodiments, wherein, between the drive means and the application unit, the elongate strip performs an incremental loop such that a displacement of the strip due to its state of stress is increased compared to the situation without loop.

35. Method according to any one of the previous embodiments, wherein the sensor unit comprises a lever mechanism or a forked lever mechanism.

DEFINITIONS

In the disclosure of the present application the following terms are defined as follows unless otherwise indicated:

"acrylic" is used to identify both acrylic as well as methacrylic monomers and polymers.

"mono-functional monomer" means a monomer having only one polymerizable group.

"multi-functional monomer" means a monomer having two or more polymerizable groups.

Any ranges identified in the present application are to be understood as including the end points unless expressly stated otherwise.

The term "pressure sensitive adhesive" is used to indicate materials (e.g., elastomers) that are either inherently tacky or that have been tackified with the addition of tackifying resins. Pressure sensitive adhesives according to the present disclosure include those that can be identified by any of the known methods for identifying pressure sensitive adhesives and include in particular those that can be identified by one or more of the following methods. According to a first method, pressure sensitive adhesives may be defined by the Dahlquist criteria described in Handbook of Pressure Sensitive Adhesive Technology, D. Satas, 2nd ed., page 172 (1989) at use temperatures. This criterion defines a good pressure sensitive adhesive as one having a 1 second creep compliance of greater than $1 \times 10^{-6}$ cm$^2$/dyne. Alternatively, since modulus is, to a first approximation, the inverse of compliance, pressure sensitive adhesives may be defined as adhesives having a modulus of less than $1 \times 10^6$ dynes/cm$^2$.

Another method of identifying a pressure sensitive adhesive is that it is aggressively and permanently tacky at room temperature and firmly adheres to a variety of dissimilar surfaces upon mere contact without the need of more than finger or hand pressure as described in "Glossary of Terms Used in the Pressure Sensitive Tape Industry" provided by the Pressure Sensitive Tape Council, August, 1985.

Another suitable method of identifying a pressure sensitive adhesive is that it preferably has a room temperature storage modulus within the area defined by the following points as plotted on a graph of modulus versus frequency at 25° C.: a range of moduli from approximately $2 \times 10^5$ to $4 \times 10^5$ dynes/cm$^2$ at a frequency of approximately 0.1 radian/second (0.017 Hz), and a range of moduli from approximately $2 \times 10^6$ to $8 \times 10^6$ dynes/cm$^2$ at a frequency of approximately 100 radians/second (17 Hz) (for example, see FIG. 8-16 on p. 173 Handbook of Pressure Sensitive Adhesive Technology, D. Satas, 2nd ed., (1989)).

Following are exemplary, non-limiting embodiments of the present disclosure.

The adhesive tape comprises a foam layer having an acrylic polymer obtainable by polymerization of a polymerizable composition comprising one or more alkyl acrylates having an average of 3 to 14 carbon atoms in the alkyl group. In a particular embodiment, the polymerizable composition further includes one or more polar monomers and/or one or more multi-functional monomers having at least two free radical polymerizable groups. In particular embodiments, the foam layer is a pressure sensitive adhesive.

The one or more alkyl acrylates of the polymerizable composition are typically mono-functional monomers and include in particular acrylic acid ester of a nontertiary alcohol in which the alkyl group contains at least about 3 carbon atoms (on average), and preferably about 4 to about 14 carbon atoms (on average). Typically, the homopolymers of such monomers have a Tg of no greater than about 0° C. Examples of classes of suitable acrylic acid esters include, but are not limited to, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Preferred acrylic acid esters that can be used include, but are not limited to, 2-ethylhexyl acrylate, isooctyl acrylate, lauryl acrylate, and 2-methylbutyl acrylate. Various combinations of such monomers can be employed. For example, a combination of two or more alkyl acrylates may be used such as a combination of 2-ethylhexyl acrylate and isooctyl acrylate.

In some embodiments, the polymerizable composition further includes one or more polar monomers, typically monofunctional polar monomers. Examples thereof include in particular acidic monomers such as carboxylic acid monomers as well as various acrylamides. Particular examples of polar monomers include acrylic acid, methacrylic acid, itaconic acid, maleic acid, fumaric acid, 2-hydroxyethyl acrylate or methacrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N,N-dimethyl acrylamide, N,N-diethyl acrylamide, and N-ethyl,N-dihydroxyethyl acrylamide, acrylonitrile, methacrylonitrile and maleic anhydride. Preferred polar monomers include, but are not limited to, acrylic acid, itaconic acid, N,N-dimethyl acrylamide, acryl amide, N-vinyl pyrrolidone and N-vinyl caprolactam. Various combinations of such polar monomers can be employed and in a particular embodiment a combination of two or more polar monomers is contemplated such as for example a combination of acrylic acid and itaconic acid.

In some embodiments, the polymerizable composition from which the acrylic polymer of the foam layer can be derived further includes one or more multi-functional monomers that have two or more ethylenically unsaturated groups. Examples of multi-functional monomers include in particular multi-functional acrylic monomers but other multi-functional monomers such as butadiene and substituted triazines such as vinyl-halomethyl-s-triazine type compounds such as for example 2,4-bis(trichloromethyl)-6-p-methoxystyryl-s-triazine. Preferred are polyacrylic-functional monomers such as, for example, pentaerythritol tetraacrylate, tripropyleneglycoldiacrylate, 1,12-dodecanediol diacrylate. Particular preferred examples of multi-functional acrylic monomers include 1,2 ethylene glycol diacrylate, hexane diol diacrylate and trimethylol propane triacrylate. The multi-functional monmers, when included in the polymerizable composition from which the acrylic polymer may be obtained are typically present in an amount of 0.01 and 1%.

In particular embodiments, the acrylic polymer of the foam layer is typically obtainable from a polymerizable composition having a major amount of the one or more alkyl acrylates, for example at least 84% by weight (based on the total weight of monomers in the composition). A typical range is from 84 to 97% by weight or from 88 to 94% by weight. When present, the amount of multi-functional monomer or monomers in the polymerizable composition is typically at least 0.01% by weight and may range for example from 0.01% by weight to 1% or less by weight of the total weight of monomers in the composition or for example from 0.1 to 0.5% by weight. The polar monomer or monomers, when included, are typically present in amount of at least 3% by weight of the total weight of monomers in the composition, an exemplary range being from 3 to 16% or from 5 to 12% by weight.

The polymerizable composition may contain further components including in particular a thixotropic agent. Examples of thixotropic agents include fumed silica. The polymerizable composition may also contain microsphere such as for example hollow glass bubbles or polymeric microspheres. Furthermore, it may be desirable to include a surfactant in the polymerizable composition. Tackifiers, in particular tackifiers suitable for use with acrylic adhesives may be added as well. Examples thereof include in particular rosin esters, aromatic resins, aliphatic resins, terpenes and partially hydrogenated and hydrogenated resins.

The polymerizable composition typically also includes an initiator for initiating a free radical polymerization including thermal as well as photo-initiators. Photoinitiators are preferred for use in connection with this invention. Examples of initiators can be found in U.S. Pat. No. 4,181,752 (Martens et al.), U.S. Pat. No. 4,833,179 (Young et al.), U.S. Pat. No. 5,804,610 (Hamer et al.), U.S. Pat. No. 5,382,451 (Johnson et al.), U.S. Pat. No. 4,619,979 (Kotnour et al.), U.S. Pat. No. 4,843,134 (Kotnour et al.), and U.S. Pat. No. 5,637,646 (Ellis). A particular example includes 2,2 dimethoxy-2-phenylacetophenone.

The foam layer of the adhesive tape will typically have a thickness of at least 0.3 mm, for example at least 0.5 mm. A typical thickness range for the foam layer is from 0.3 mm up to 2 mm, for example from 0.5 mm up to 1.5 mm or from 0.7 mm to 1.2 mm.

In some embodiments, the foam layer is obtained and produced according to the methods described in U.S. Pat. No. 4,415,615. The process typically comprises frothing the polymerizable composition, coating the froth on a backing such as for example a release liner and polymerizing the polymerizable composition.

Frothing is conveniently accomplished by whipping a gas into the polymerizable composition. Useful frothing gases typically are inert and include nitrogen gas or carbon dioxide. In a particular embodiment, the monomers of the polymerizable composition may be partially polymerized prior to frothing so as to achieve a desirable viscosity for the frothing step. Useful viscosities to froth a composition are typically between 1000 and 40,0000 cps. The viscosity is typically selected so as to achieve a desired cell uniformity. For example, above 5000 cps, a higher cell uniformity will typically be obtained.

Additionally and alternatively to using prepolymerization to achieve a desired viscosity, a thixotropic agent such as fumed silica may be used. In such case, polymerization may be carried out in one step.

Polymerization of the polymerizable composition may be carried out by heat activation but preferably is photoinitiated and hence the polymerizable composition will typically contain a photoinitiator. Typically, photoinitiation is carried out by UV irradiation and a UV initiator will be used. If the polymerization is carried out in two steps (in case of pre-polymerization to enable a suitable viscosity as described above), the amount of photo-initiator initially used may be enough to allow initiation of further polymerization. Typically however, a further addition of photoinitiator may be desired to initiate further polymerization following frothing.

When the polymerization is to be effected by ultraviolet radiation, the polymerizable coating is preferably protected from air by a plastic film overlay which is fairly transparent to ultraviolet radiation and has a low-adhesion surface. Biaxially-oriented polyethylene terephthalate film which is about 75% transparent to ultraviolet radiation is very useful. If the underlying backing also has a low-adhesion surface, both the backing and the transparent plastic film can be stripped away so that the cellular adhesive membrane may be used for mounting objects. For such use, the cellular membrane may be reinforced by a tissue-like web to avoid becoming distorted if it is to be removed from both the backing and the transparent overlay before being applied.

If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air.

Regardless of the process by which the cellular structure of the adhesive membrane is created, it is preferred to include a surfactant in the composition, preferably a silicone or a fluorochemical known to be useful for foaming organic liquids that have low surface tension. By doing so, foams with cellular adhesive membranes of good uniformity can be produced wherein the cells have an average diameter within the range of 0.05 to 0.3 mm. Typically, 90% of the cells of the adhesive membrane vary in size no more than 2:1, but some of the adhesive membranes have been characterized by significant variations in cell size.

In addition to or alternative to the use of frothing to obtain the foam layer, hollow microspheres may be included in the polymerizable composition. The microspheres may include expandable and non-expandable microspheres. Expandable microspheres are spheres that expand upon heating and include in particular expandable polymeric microspheres that include a polymer shell and a core material in the form of a gas, liquid or combination thereof that expands upon heating. An expandable microsphere is one where the shell can initially be expanded or further expanded without breaking. Methods for making a foamed layer using expandable microspheres are disclosed in WO 00/006637. Examples of suitable expandable microspheres include those commercially available from Pierce Stevens (Buffalo, N.Y.) under designations F30D, D80SD and F100D. Further useful expandable microspheres include Expancel 551, Expancel 461 and Expancel 091, available from Akzo Nobel. Each of these microspheres has an acrylonitrile-containing shell. The non-expandable microspheres may be polymeric or non-polymeric. Particularly suitable non-expandable microspheres include hollow glass bubbles.

The foam layer should have a density of at least 540 kg/m$^3$, typically at least 570 kg/m$^3$ or at least 600 kg/m$^3$. Generally, a higher density has been found to improve the performance of the adhesive tape when applied to door frames and in particular, the adhesion at areas of strong curvature may be improved. However, the density should not be so high that the foam layer loses its foam characteristics. Typically, the maximum density should not exceed 900 kg/m$^3$, or in a particular embodiment should not exceed 850 kg/m$^3$. The desired density can be obtained by the level of frothing and/or amount of hollow microspheres that is included in the composition for the foam layer.

On one or both opposite major sides of the foam layer is provided a pressure sensitive adhesive layer (also called skin layer) that comprises a cross-linked rubber. The cross-linked rubber may be obtained from crosslinking, typically through e-beam, of a cross-linkable block copolymer that has a rubbery block and a glassy block. Generally, a rubbery block exhibits a glass transition temperature (Tg) of less than room temperature. In some embodiments, the Tg of the rubbery block is less than about 0° C., or even less than about −10° C. In some embodiments, the Tg of the rubbery block is less than about −40° C., or even less than about −60° C.

Generally, a glassy block exhibits a Tg of greater than room temperature. In some embodiments, the Tg of the glassy block is at least about 40° C., at least about 60° C., at least about 80° C., or even at least about 100° C.

A suitable block copolymer includes one or more a rubbery blocks, R, and one or more glassy blocks, G. In some embodiments, the block copolymer comprises at least three glassy blocks. In some embodiments, the block copolymer comprises between three and five glassy blocks, inclusive. In some embodiments, the block copolymer comprises four glassy blocks.

In some embodiments, the block copolymer is a multi-arm block copolymer having the general formula $Q_n$-Y, wherein Q represents an arm of the multi-arm block copolymer; n represents the number of arms and is a whole number of at least 3; and Y is the residue of a multifunctional coupling agent. Each arm, Q, independently has the formula R-G, wherein G represents the glassy block; and R represents the rubbery block.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof.

In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In the general formula for some multi-arm block copolymers of the present disclosure, $Q_n$-Y, n represents the number of arms and is a whole number of at least 3, i.e., the multi-arm block copolymer is a star block copolymer. In some embodiments, n ranges from 3-10. In some embodiments, n ranges from 3-5. In some embodiments, n is 4. In some embodiments, n is equal to 6 or more.

In some embodiments, the first block copolymer is a polymodal block copolymer. As used herein, the term "polymodal" means that the copolymer comprises glassy blocks having at least two different molecular weights. Such a block copolymer may also be characterized as having at least one "high" molecular weight glassy block, and at least one "low" molecular weight glassy block, wherein the terms high and low are used relative to each other. In some embodiments the ratio of the number average molecular weight of the high molecular weight glassy block, $(Mn)_H$, relative to the number average molecular weight of the low molecular weight glassy block, $(Mn)_L$, is at least about 1.25.

In some embodiments, $(Mn)_H$ ranges from about 5,000 to about 50,000 g/mol. In some embodiments, $(Mn)_H$ is at least about 8,000, and in some embodiments at least about 10,000. In some embodiments, $(Mn)_H$ is no greater than about 35,000 g/mol. In some embodiments, $(Mn)_L$ ranges from about 1,000 to about 10,000 g/mol. In some embodiments, $(Mn)_L$ is at least about 2,000, and, in some embodiments, at least about 4,000. In some embodiments, $(Mn)_L$ is less than about 9,000 g/mol, and, in some embodiments, less than about 8,000 g/mol.

In some embodiments, the first block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the glassy blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

Still further, the cross-linked rubber of the pressure sensitive adhesive layer may be obtained from the cross-linking of a linear block copolymer of the formula $$R\text{-}(G)_m$$

wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

In some embodiments, the rubbery block of the linear block copolymer comprises a polymerized conjugated diene, a hydrogenated derivative thereof, or combinations thereof. In some embodiments, the conjugated dienes comprise 4 to 12 carbon atoms. Exemplary conjugated dienes useful in the second block copolymer include any of the exemplary conjugated dienes described above.

In some embodiments, at least one glassy block, and in some embodiments, each glassy block of the linear block copolymer comprises a polymerized monovinyl aromatic monomer. In some embodiments, the monovinyl aromatic monomers comprise 8 to 18 carbon atoms. Exemplary polymerized monovinyl aromatic monomers useful in the second block copolymer include any of the exemplary polymerized monovinyl aromatic monomer, as described above.

In a particular embodiment a mixture of the linear block copolymer and the aforementioned and described multi-arm block copolymer is used to obtain the cross-linked rubber of the pressure sensitive adhesive layer. In some embodiments, the ratio of multi-arm block copolymers to linear block copolymers ranges from 1.5:1 to 9:1. In some embodiments, the ratio of multi-arm block copolymers to linear block copolymer is at least 1.85:1, or even at least 3:1. In some embodiments, the ratio of multi-arm block copolymers to linear block copolymers is no greater than 5.7:1, or even no greater than 4:1.

The pressure sensitive adhesive layer in a particular embodiment further includes one or more tackifiers and optionally one or more plasticizers. Generally, a tackifier will be selected to be compatible with a rubbery block of a block copolymer as may be used for obtaining the cross-linked rubber. As used herein, a tackifier is "compatible" with a block if it is miscible with that block. Generally, the miscibility of a tackifier with a block can be determined by measuring the effect of the tackifier on the Tg of that block. If a tackifier is miscible with a block it will alter (e.g., increase) the Tg of that block.

A tackifier is "primarily compatible" with a block if it is at least miscible with that block, although it may also be miscible with other blocks. For example, a tackifier that is primarily compatible with a rubbery block will be miscible with the rubbery block, but may also be miscible with a glassy block.

Generally, resins having relatively low solubility parameters tend to associate with the rubbery blocks; however, their solubility in the glassy blocks tends to increase as the molecular weights or softening points of these resins are lowered. Exemplary tackifiers that are primarily compatible with the rubbery blocks include polymeric terpenes, hetero-functional terpenes, coumarone-indene resins, esters of rosin acids, disproportionated rosin acid esters, hydrogenated rosin acids, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

In particular embodiments, a first high Tg tackifier having a glass transition temperature (Tg) of at least 60 degrees Celsius (° C.). As used herein, the terms "high glass transition temperature tackifier" and "high Tg tackifier" refers to a tackifier having a glass transition temperature of at least 60° C. In some embodiments, the first high Tg tackifier has a Tg of at least 65° C., or even at least 70° C. In some embodiments, the first high Tg tackifier has a softening point of at least about 115° C., and, in some embodiments, at least about 120° C.

In some embodiments, the block copolymer adhesive compositions include a second high Tg tackifier that is primarily compatible with the glassy block(s) of the multi-arm block copolymer and, optionally, with the glassy block(s) of the linear block copolymer. Generally, a tackifier that is primarily compatible with a glassy block is miscible with the glassy block and may be miscible with a rubbery block.

Generally, resins having relatively high solubility parameters tend to associate with the glassy blocks; however, their solubility in the rubbery blocks tends to increase as the molecular weights or softening points of these resins are lowered. Exemplary tackifiers that are primarily compatible with the glassy blocks include coumarone-indene resins, rosin acids, esters of rosin acids, disproportionated rosin acid esters, C9 aromatics, alpha-methyl styrene, C9/C5 aromatic-modified aliphatic hydrocarbons, and blends thereof.

In some embodiments, the pressure sensitive adhesive layer further comprises at least one component selected from the group consisting of a low Tg tackifier, a plasticizer, and combinations thereof. As used herein, the term "low glass transition temperature tackifier" refers to a tackifier having a glass transition temperature of less than 60° C. Exemplary low Tg tackifiers include polybutenes.

Generally, a plasticizer is compatible with one or more blocks of the linear block copolymer, and/or one or more blocks of the multi-arm block copolymer. Generally, a plasticizer that is compatible with a block will be miscible with that block and will lower the Tg of that block. Exemplary plasticizers include naphthenic oils, liquid polybutene resins, polyisobutylene resins, and liquid isoprene polymers.

In some embodiments, the ratio of the total amount of high glass transition temperature tackifiers to block copolymers ranges from 0.8:1 to 1.25:1. In some embodiments, the ratio of the total amount of high Tg tackifiers to block copolymers is at least 0.85:1, or even at least 0.9:1. In some embodiments, the ratio of the total amount of high Tg tackifiers to block copolymers is no greater than 1.15:1, or even no greater that 1.1 to 1.

In some embodiments, the ratio of the rubbery block compatible high Tg tackifier to the glassy block compatible high Tg tackifier is ranges from 1:1 to 9:1. In some embodiments, the ratio of the rubbery block compatible high Tg tackifier to the glassy block compatible high Tg tackifier is at least 1.25:1, or even at least 1.5:1. In some embodiments the ratio of the rubbery block compatible high Tg tackifier to the glassy block compatible high Tg tackifier is no greater than 4:1, or even no greater than 3:1.

In a particularly preferred embodiment, the pressure sensitive adhesive layer also includes an acrylic pressure sensitive adhesive component. Typically, the pressure sensitive adhesive layer comprises at least about 0.1 parts, in some embodiments, at least about 0.5 parts, at least about 1 part, or even at least about 2 parts of an acrylic pressure sensitive adhesive component.

In a particular embodiment, the pressure sensitive adhesive layer comprise no greater than about 10 parts, in some embodiments, no greater than about 8 parts, no greater than about 5 parts, or even no greater than about 4 parts of the acrylic pressure sensitive adhesive component. The amount of cross-linked block copolymer will typically be between 30 and 60 or between 30 and 50 parts by weight of the total weight of the pressure sensitive adhesive layer.

In another embodiment, the acrylic pressure sensitive adhesive component may be comprised in the pressure sensitive adhesive layer in an amount of between 40 and 60 parts by weight. In this embodiment, the amount of cross-linked block copolymer will typically be between 10 and 20 parts by weight of the weight of the pressure sensitive adhesive layer.

Typically, the acrylic pressure sensitive adhesive component of the pressure sensitive adhesive layer is an acrylic polymer derived from one or more acrylic esters of a non-tertiary alkyl alcohol that contains 3 to 14 carbon atoms. Exemplary acrylic acid esters include isooctyl acrylate, 2-ethylhexyl acrylate, butyl acrylate, isobornyl acrylate, and combinations thereof. Exemplary methacrylic acid esters include the methacrylate analogues of these acrylic acid esters. Typically, the acrylic polymer will further comprises one or more units derived from a polar monomer such as for example described above.

In some embodiments, the acrylic polymer comprises at least about 70 parts, in some embodiments, at least about 80 parts, at least about 90 parts, at least about 95 parts, or even about 100 parts of at least one acrylic or methacrylic ester of a non-tertiary alkyl alcohol. In some embodiments, acrylic polymer comprises no greater than about 30 parts, in some embodiments, no greater than about 20 parts, no greater than about 10 parts, no greater than about 5 parts, and even no greater than 1 part of at least one copolymerized polar monomer. In some embodiments, the acrylic adhesive composition does not include a copolymerized polar monomer.

In some embodiments, the ratio of the combination of the block copolymers and high Tg tackifiers to the acrylic pressure sensitive adhesive component is at least 8.3:1. In some embodiments, the ratio of the combination of the block copolymers and high Tg tackifiers to the acrylic pressure sensitive adhesive component is at least 12.5:1, at least 22:1, at least 90:1, or even at least 180:1.

In some embodiments, the ratio of the combination of the block copolymers, high Tg tackifiers, and acrylic pressure sensitive adhesive component to the liquid plasticizer ranges from 32:1 to 10:1. In some embodiments, the ratio of the combination of the block copolymers, high Tg tackifiers, and acrylic pressure sensitive adhesive component to the liquid plasticizer is no greater than 25:1, or even no greater than 20:1. In some embodiments, the ratio of the combination of the block copolymers, high Tg tackifiers, and acrylic pressure sensitive adhesive component to the liquid plasticizer is at least 12.5:1.

The pressure-sensitive adhesive compositions for providing the pressure sensitive adhesive layer on the foam layer can be made using methods known in the art. For example, they can be made by dissolving the block copolymers, suitable tackifiers, any plasticizer(s), and any other additives including an acrylic pressure sensitive adhesive component in a suitable solvent, and coating onto a release liner or directly onto the foam layer using conventional means (e.g., knife coating, roll coating, gravure coating, rod coating, curtain coating, spray coating, air knife coating). In some embodiments, the pressure-sensitive adhesive composition of the pressure sensitive adhesive layer is prepared in a substantially solvent-free process (i.e., the adhesive contain no greater than about 20 wt. % solvent, in some embodiments, no greater than about 10 wt. % solvent and, in some embodiments, no greater than about 5 wt. % solvent, in some embodiments, no greater than 1 wt. % solvent, or even no greater than trace amounts of solvent (i.e., essentially no solvent). Such substantially solvent-free processes are known and include, e.g., compounding by calendaring or roll milling, and extruding (e.g., single. screw, twin screw, disk screw, reciprocating single screw, pin barrel single screw, etc.). Commercially available equipment such as BRABENDER or BANBURY internal mixers are also available to batch mix the adhesive compositions. After compounding, the adhesive may be coated through a die into a desired form, such as a layer of adhesive, or it may be collected for forming at a later time. In a particular embodiment the pressure sensitive adhesive composition may be extruded on the foam layer or may be extruded on a release liner and then subsequently laminated to the foam layer. In yet a further embodiment, the foam layer and pressure sensitive adhesive layer may be co-extruded. Such will be possible where the foam layer does not include a cross-linked acrylic polymer and hence the composition of the foam layer can be extruded.

The pressure sensitive adhesive layer is typically applied on the foam layer at a weight per area of between 40 and 100 g/m$^2$.

In accordance with an embodiment of making the adhesive tape, the cross-linkable rubber, for example one or more cross-linkable block copolymers as described above, of the pressure sensitive layer is cross-linked. In a particular embodiment, the cross-linkable rubber is cross-linked by subjecting the pressure sensitive adhesive layer on the foam layer to e-beam irradiation. Typically, e-beam irradiation will be carried out with an acceleration voltage of between 100 and 300 keV and a dose of 2 to 9 MRad. In a particular embodiment the e-beam irradiation is focused at the interface of the pressure sensitive adhesive layer and foam layer. In another embodiment, the focus of the e-beam may be in the proximity of the interface, for example within about 10 and 30 micrometer of the interface, with the focus in the foam layer or in the pressure sensitive adhesive layer. Yet in an alternative embodiment, the e-beam irradiation may be such to irradiate both the pressure sensitive adhesive layer and foam layer, which may lead to cross-linking in the foam layer as well. This may be particularly desired in case the foam layer is based on an acrylic polymer obtained from the polymerization of a composition that does not include the multi-functional monomers.

When the pressure sensitive adhesive composition having a cross-linkable rubber is provided on both opposite major sides of the foam layer, it will typically be preferred to irradiate such a laminate from both opposite major sides either sequentially of simultaneously.

In another embodiment, the pressure sensitive adhesive layer having a cross-linked rubber may be provided on only one of the major sides of the foam layer. The other major side may then be left without a further adhesive layer as the foam layer in accordance with the present invention will typically have useful pressure sensitive adhesive characteristics. In an alternative embodiment, a further adhesive layer may be provided on the major side opposite to the major side having the pressure sensitive adhesive layer with the cross-linked rubber. Such further adhesive layer may include any common pressure sensitive adhesive including acrylic pressure sensitive adhesive layers, silicone based adhesives, polyurethane based adhesives, poly-alpha olefins and the like.

Typically, the adhesive tape will further include a release liner protecting the pressure sensitive adhesive layer(s) of the adhesive tape. When applying the adhesive tape, the release liner will be removed to expose the pressure sensitive adhesive layer and allowing application and adhesion of the adhesive tape to the substrate.

In yet a further embodiment, a further adhesive layer provided on the opposite major side may include a heat-activatable adhesive layer. With heat-activatable adhesive layer is meant an adhesive that requires heating in order to develop its maximum bond strength in bonding to a substrate. A heat-activatable adhesive may or may not have useful pressure sensitive adhesive properties at room temperature (about 25° C.). Typically, a heat-activatable adhesive for use with the present invention will be based on a thermoplastic polymer such as for example a film of a copolymer of ethylene and propylene, thermoplastic polyurethane which may be tackified or not.

In a particular embodiment, elongate strip comprises a rubber gasket. The rubber gasket is attached to the adhesive tape or tape through the further adhesive layer. In a particular embodiment, that further adhesive layer comprises a heat-activatable adhesive and in particular a hot-melt adhesive.

In accordance with the presently disclosed method, the elongate strip is applied using a device. This device will now be described in more detail with reference to the following drawings, without the intention to limit the invention thereto:

FIG. 3 schematically shows sensor unit of the stress control unit, wherein

Figure 1:
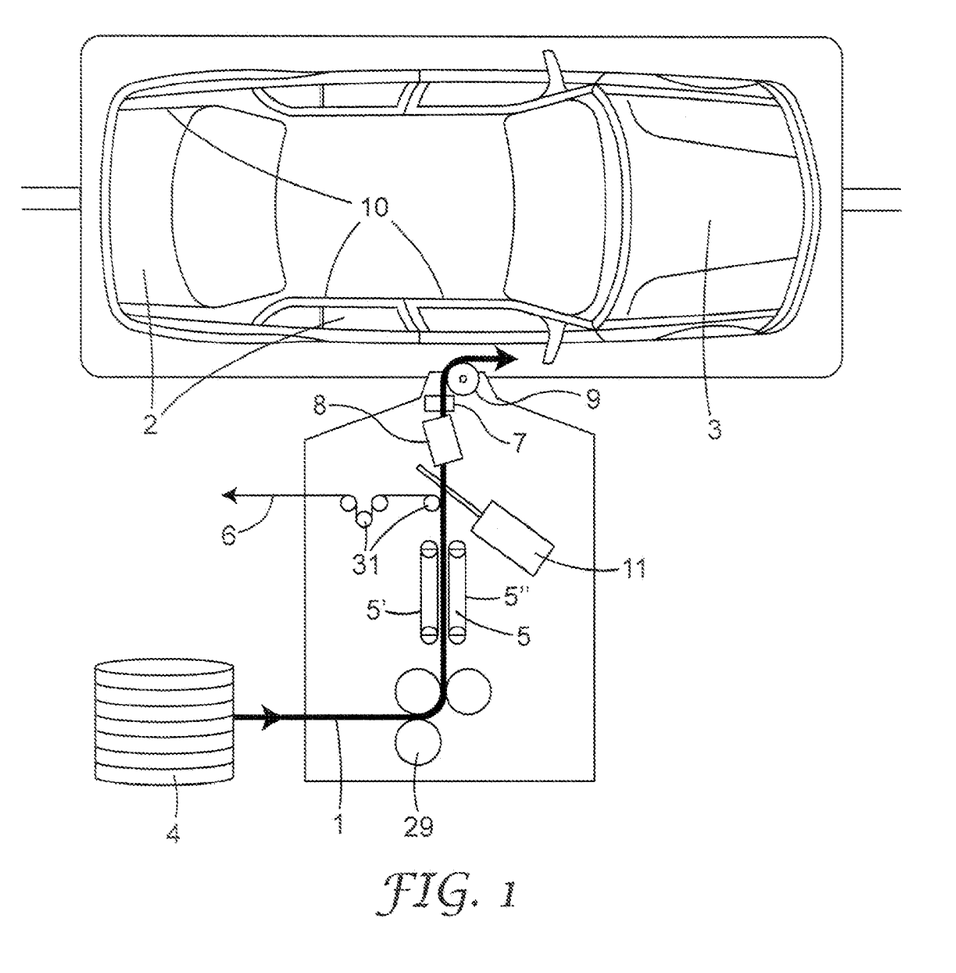
FIG. 1 shows a schematic sketch of a device for applying an elongate strip.

FIG. 1 shows a device (or procedure) for the application of elongate strips 1 including the adhesive tape to apertures or openings 2 of car bodies 3. As shown, an endless elongate strip or seal 1 is provided from a supply roll 4. The strip is peeled off the roll 4 and advanced by drive means 29. The device further or alternatively comprises counter belt drives 5 for further advancing without slip the elongate strip. Drive means 5 are generally arranged close to a pin roller 9, to be discussed below. Typically, the distance between the drive means 5 and the pin roller 9 is in the range between about 100 and 300 mm, for example in the range between about 150 and 250 mm or in the range between about 170 and 220 mm. Typically, this distance is measured between the end of drive means 5 and the center point or axis of pin roller 9. Generally, this distance corresponds to the free length of the elongate strip between the pin roller 9 and the drive means 5 along which the elongate strip does not contact the drive means 5 and the pin roller 9. Seen in the direction of advancement of the elongate strip as affected by drive means 5 the liner 6 covering the pressure sensitive adhesive layer of the adhesive tape of the elongate strip 1 is removed behind the drive means 5. The liner 6 is removed and disposed by respective means 31 in a controlled way. The respective means 31 for removing and disposing a liner 6 are optional and their provision depends on whether an elongate strip has a liner.

The specific location of the sensor measurement allows the stress of the elongated strip to be reliably controlled without being influenced by the initial stress which the elongate strip has before reaching the driving means 5 when seen in the direction of advancement of the elongate strip 1. When an elongate strip 1 comprising a liner 6 is used with the device, the measurement of the stress of the elongate strip 1 conveniently can take place after the removal of the liner 6, when seen in the direction of travel or advancement of the strip 1.

The device may further comprise a guidance unit 7 which is used for guiding the elongate strip prior to application along a defined path. The device further comprises a stress control unit 8 for controlling the stress of the elongate strip, directly or immediately prior to application, in a controlled and reproducible manner.

The device further comprises a pin roller 9, preferably a driven pin roller 9, which is for positioning, pressing and/or rolling the elongate strip in a controlled way onto the substrate, here the flange 10 of a car body.

For the application procedure, an application head is mounted to an axis which is preferably rotatable around 360 degrees. The elongate strip is applied in a circulating manner with its adhesive surface applied upon a designated track on the substrate, here the flange 10 of the aperture of a car body.

According to a particular embodiment, the device further comprises a cutting mechanism 11 located between the pin roller 9 and the drive means 5 for cutting the elongate strip to a defined length thereby allowing or ensuring a gapless joint (start/end) of the strip to be applied on a substrate in a closed contour. Generally, the respective cutting process is controlled by sensors.

According to a particular embodiment in which the device comprises a cutting unit 11, the elongate strip is cut in an angle of about 5° to 25°, for example about 7° to 15° or about 10° towards the normal of the longitudinal axis of the elongate strip. This allows, if the elongate strip is to be applied to a substrate in a closed contour, an improved and more reliable closure of the contour between the end of the first elongate strip and the beginning of the preceding elongate strip.

Figure 2:
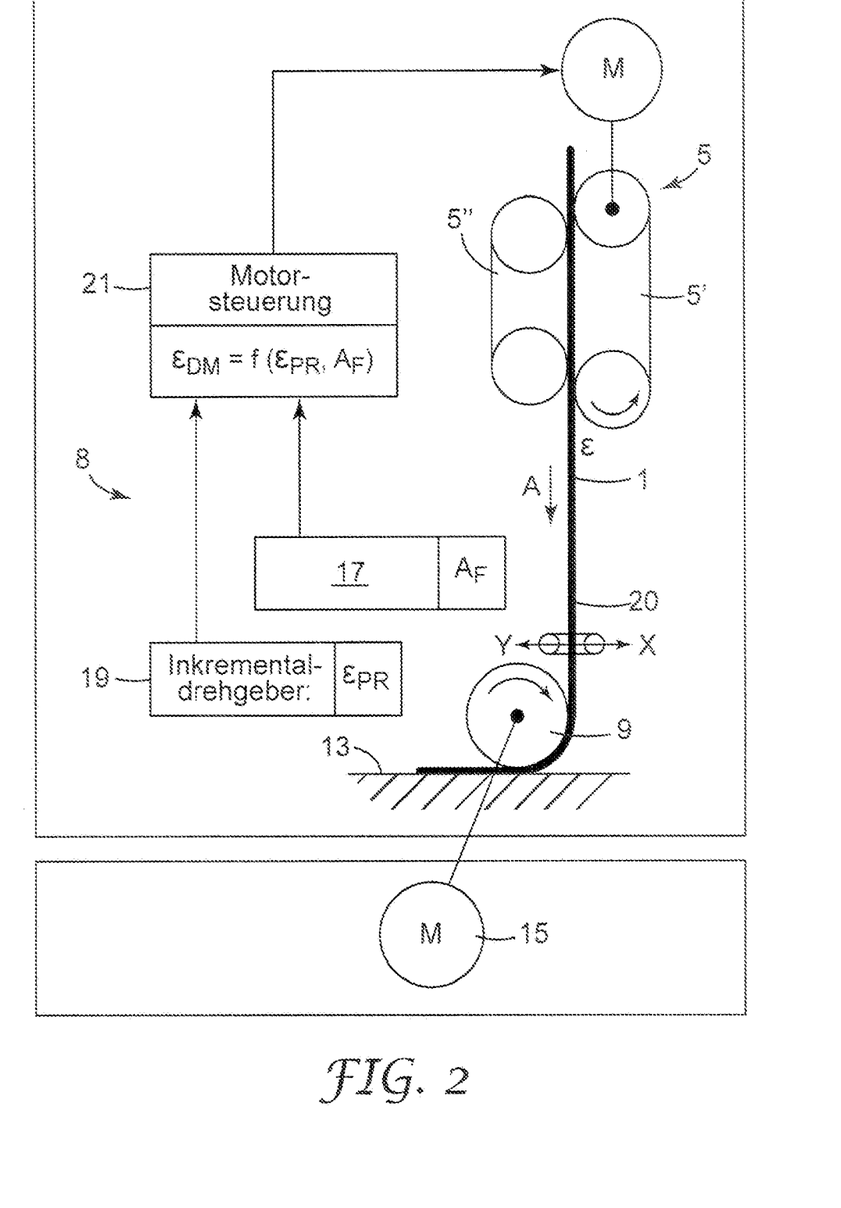
FIG. 2 shows a further schematic view on a device for use with the presently disclosed method.

FIG. 2 shows a schematic view of a device and process. Accordingly, an elongate strip 1 is advanced or driven by drive means 5. As shown in FIG. 2, drive means 5 are constituted by belt drives 5' and 5". Drive means 5 may also be constituted by further drive means known in the art, such as drive rollers etc. However, belt drive means and particularly, opposing belt drive means are preferred since such drive means allow a particularly controlled, exact and slipless drive of the elongate strip 1.

FIG. 2 also shows the pin roller 9 for positioning, pressing and/or rolling the elongate strip 1 in a controlled way onto a substrate 13. The torque of the pin roller 9 is adjustable and pin roller 9 is preferably driven by a motor M 15. According to a particular embodiment, motor M 15 is used to control the torque as turning moment of the pin roller 9. The provision of a motor M 15 allows the application of the elongate strip to the substrate at a defined stress level, e.g., a defined strain or elongation. In accordance with the method of the present invention, the amount of elongation of the elongate strip is between 0 and 3%, for example between 0 and 2.5%, or between 0 and 2% or between 0 and 1.8%. Generally the amount of elongation will be between 0.1% and 2%. However, the provision of motor M 15 is one particular embodiment and a pin roller 9 may also work without the provision of motor M 15. In this case, the elongate strip is applied to the substrate in a stress free condition.

FIG. 2 also shows that the device comprises a stress control unit 8 for controlling whether the elongate strip is under stress, particular, under tensile stress. The stress control unit 8 comprises a sensor unit 17, arranged and suitable for detecting the stress of the elongate strip in an area between the drive means 5 and the pin roller 9. Generally, the sensor unit 17 is an odometer or a displacement transducer detecting and/or measuring a displacement of the strip which is due to the state of stress in the strip. The sensor unit 17 is, according to an embodiment, a forked lever mechanism as will be discussed later in more detail with regard to FIG. 3.

The sensor unit 17 detects the state of stress of the elongate strip 1, generates a respective signal indicative of the stress of the elongate strip 1 and provides this signal to the control unit 21 of stress control unit 8. The stress control unit may further comprise evaluation or control means 21 which, on the basis of the sensor signal provided by the sensor means 17 generates an input signal to the drive means 5. The speed and/or moment of the drive means 5 is changed in accordance with the input signal received from the stress control unit 17. Thereby, the stress of the elongate strip 1 after the drive means and before the pin roller, seen in feeding direction of the elongate strip 1 as indicated by arrow A and thus, the stress at the moment of application to the substrate can be adjusted.

In an embodiment, the pin roller 9 is a driven pin roller. This particular embodiment is indicated in FIG. 2 as system B wherein the pin roller 9 is driven by motor M 15. The driven pin roller 9 has an adjustable torque due to the provision of motor M 15. If the pin roller 9 is a driven pin roller, stress control unit 8 may further comprise a second sensor unit 19 for detecting information, such as the angular position, of pin roller 9. A respective signal is also provided to the stress control unit 8. Stress control unit 8 provides output instructions to the drive means 5 and/or pin roller 9/motor M 15 based on the signals provided by the sensor units 17 and 19.

According to a particular embodiment, sensor unit 19 determines a value $\epsilon_{PR}$ indicative of the angular position of the pin roller 9 and sensor unit 17 determines a value $A_F$ indicative of the, e.g., dislocation of strip 1, e.g., via a forked lever. The stress control unit 8 now evaluates a signal $\epsilon_{DM}$ indicative of a corresponding angular position of the drive means 5 which is provided to the drive means 5 by the stress control unit. Typically, $\epsilon_{DM}=f(\epsilon_{PR}, A_F)$.

Figure 3A:
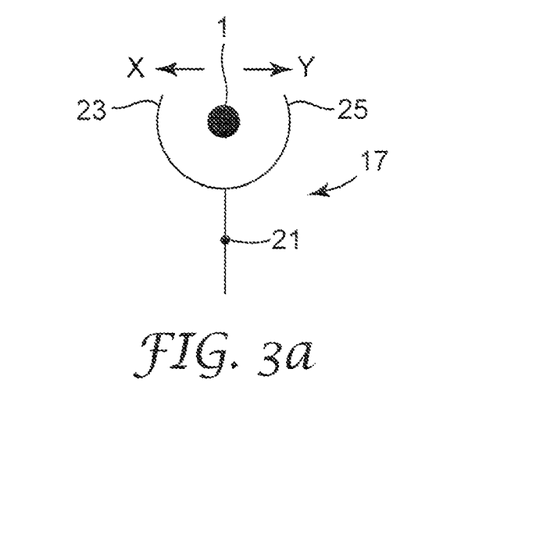
FIG. 3a shows a side view of the respective sensor means and FIG. 3b shows a top view on the respective sensor means.
Figure 3B:
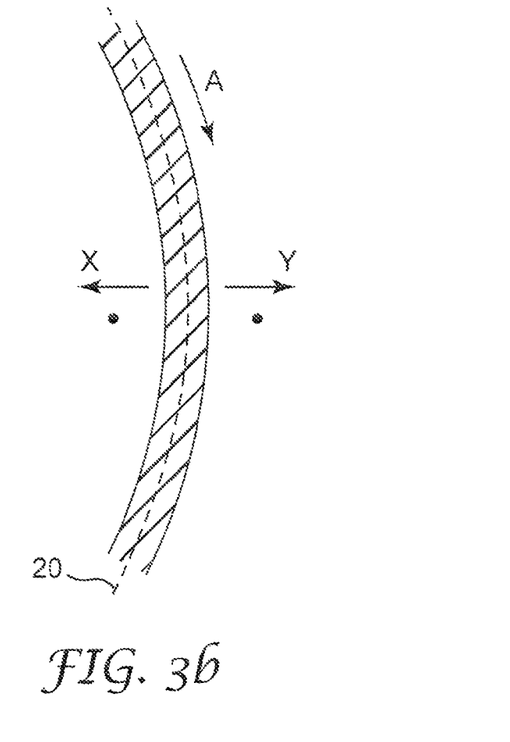

FIG. 3 shows a (top) view on a elongate strip 1 in the area between drive means 5 and pin roller 9 as, e.g., shown in FIG. 2 wherein also a sensor unit 17 in the particular form of a forked lever is shown. FIG. 3a shows a side view of the sensor unit 17 in its form of a forked lever. FIG. 3b shows a top view of the sensor unit 17.

As can be seen in FIG. 3a, elongate strip 1 runs between two side arms of a forked lever comprising a forked lever or U-shaped portion. In a neutral, i.e., stress free status, elongate strip 1 neither touches the left arm 23 nor the right arm 25 (seen in the orientation according to FIG. 3a of forked lever mechanism 17) of the forked portion. However, as seen in FIGS. 2 and 3b, the neutral path 20 along which elongate strip 1 runs in a stress free situation, is such that, if a tensile or compressive stress is applied to elongate strip 1, elongate strip 1 leaves the neutral path and is dislocated to the right or to the left of its neutral path 20, as indicated by arrows X and Y in FIGS. 2 and 3. As can further be seen in FIG. 3b, according to a particular embodiment, the neutral path 20 of elongate strip 1 is slightly curved in the area between the drive means 5 and pin roller 9. Accordingly, referring to the orientation seen in FIG. 3b, if compressive stress is applied to the elongate strip 1, the curvature increases, i.e., that the radius of the curvature decreases, and the elongate strip moves towards the right as indicated by arrow Y in FIG. 3b. Contrary thereto, if tensile strength is applied to elongate strip 1 in the area after drive means 5 the curvature tends to straighten, i.e., the radius of the curvature enlarges, and the elongate strip 1 moves in direction X, i.e., to the left in FIG. 3, at the location of the sensor unit 17.

As can be seen in the side view shown in FIG. 3a, if elongate strip 1 moves in the direction of arrow X, it will touch the arm 23 of sensor unit 17 thereby dislocating the forked lever means from its neutral position in that it (anti-clock wise) turns around pivot 21 resulting in a dislocation of both the forked position comprising arms 23 and 25 as well as to the opposite portion on the other side of pivot point 21 of sensor unit 17. Now if the elongate strip 1 moves toward the right, i.e., in direction of the arrow X this would lead to a dislocation of the arm 25 in a corresponding (clock wise) turning of forked lever unit 17 around pivot 21. It is to be noted that form and arrangement of forked lever sensor unit 17 is of exemplary and non-limiting nature only. The dislocation of a forked lever means, either dislocation of the arms 23, 25 or the dislocation of the opposite end of the forked lever unit is detected and the respective dislocation $A_F$ is provided to the stress control unit 8.

A person skilled in the art appreciates that the sensor unit may also be of different forms and techniques than the lever or forked lever mechanism discussed above. In particular, according to further embodiments, a dislocation of the elongate strip 1 may further be determined by means of contact or contactless sensor unit such as, e.g., optical methods and devices.

Figure 4:
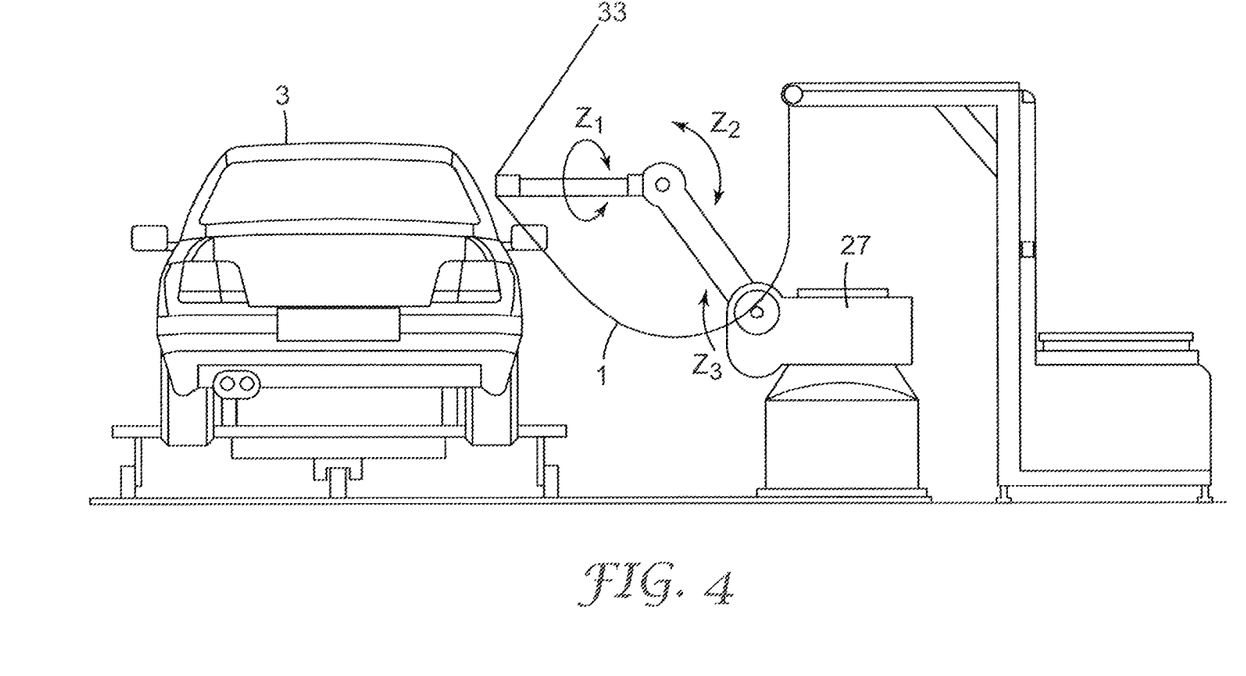
FIG. 4 shows a schematic view of a device for use with the method of the present invention mounted to a robot for applying seal strips to a vehicle body.

FIG. 4 shows a device according to the present invention used with a mounting head 33 for applying elongate strips 1 to car bodies 3, when the device is mounted on a robot 27 having several degrees of freedom of movement, e.g., $Z_1$ to $Z_3$.

According to particular embodiments of the present invention, the method of the present invention is a static, dynamic or hybrid method, i.e, the application device is moving while the substrate stands still (dynamic), the device stands still while the substrate is moving (static) or both device and substrate are moving (hybrid).

According to a particular embodiment, the elongate strip includes machine readable data and the device for applying the elongate strip further includes means for reading the machine readable data such that the desired stress range in the application can be set based on the readout of the machine readable data. For example, the elongate strip may include a bar code applied either as an adhesive label or printed on the elongate strip. Preferably, the machine readable data is repeated across the length of the elongate strip such that upon re-installing the elongate strip, the data is available within a reasonable short distance. The reading means of the device may include a bar code reader for reading the machine readable data when provided in the form of a bar code.

In a particular embodiment, the machine readable data comprises an identification code. This identification code may then be used in the device to retrieve the desired stress range setting corresponding to the identification code. In one embodiment, the device may include a storage device containing such correspondence information. Alternatively, the device may include communication means which may be wired or wireless enabling retrieval of the information from a remote storage. In another embodiment, the machine readable data included with the elongate strip may include the stress setting itself.

EXAMPLES

In the following examples, the invention is further illustrated without however the intention to limit the invention thereto. All parts are by weight unless otherwise indicated.

Test Method

The rubber seals obtained as described in the examples below were applied to the a painted metal piece along a curve having a radius of 55 mm and along radial length of 110° using a device as described in FIG. 1. The paint on the metal piece was CeramiClear 5 paint commercially available from PPG. The amount of elongation of the rubber seal was varied as set out in table 5 below. Detachment of the rubber seal in areas of curvature was evaluated by the amount of extension of the adhesive foam tape in the direction perpendicular to the plain of attachment of the tape. This evaluation was carried out 24 hours after attachment and keeping the prepared samples under ambient conditions of temperature and humidity, then again after 72 hours and following this the samples were put in a climate chamber where they were cycled 7 times through the following cycles: 4 hours at −40° C. at 0% relative humidity, 4 hours at 90° C. at 0% relative humidity and 16 hours at 38° C. and 98% relative humidity (in table 5 below this is referred to as "cycle test").

Materials Used

TABLE 1

Summary of materials

| Abbreviation | Chemical name | Supplier |
| --- | --- | --- |
| AA | Acrylic Acid | |
| BA | Butyl acrylate | |
| IOA | Isooctyl acrylate | |
| 2-EHA | 2-Ethylhexyl acrylate | |
| HDDA | Hexanediol diacrylate | |

TABLE 1-continued

Summary of materials

| Abbreviation | Chemical name | Supplier |
|---|---|---|
| Irgacure 651 | 2,2 dimethoxy-2-phenylacetophenone | Ciba Specialty Chemicals Corp. (Tarrytown, NY) |
| IOTG | Isooctyl thioglycolate | |
| Kraton 1161-D | SIS linear block copolymer (15% S, 19% diblock) | Kraton Polymers, Inc. (Houston, Texas) |
| Santicizer 141 | 2-ethylhexyl diphenyl phosphate | Ferro Co. (Bridgeport, New Jersey) |
| Escorez 1310 | Aliphatic C-5 tackifying resin | Exxon Mobil Chemical LTD. (Southampton, Hampshire, GB) |
| 4900 MB | Black pigment having a 50/50 blend of carbon black in ethylene vinyl acetate copolymer resin having a melt index of about 150 | MA Hanna Color (Suwannee, Georgia) |
| Superester W-115 | Stabilized rosin acid ester | Arakawa Chemical USA (Chicago, IL) |
| Irganox 1010 | Pentaerythritol tetrakis (3-(3,5-di-tert-butyl-4-hydroxyphenyl) propionate) | Ciba Specialty Chemicals Corp. (Tarrytown, NY) |
| Tinuvin 328 | 2-(2-hydroxy-3,5-di-(tert)-amylphenyl)benzotriazole | Ciba Specialty Chemicals Corp. (Tarrytown, NY) |
| Regalite R1125 | Hydrogenated hydrocarbon resin | Eastman Chemical Co. (Kingsport, TN) |
| Cumar 130 | Aromatic thermoplastic resin | Neville Chemical Co. (Pittsburgh, PA) |
| Nyplast 222B | Naphthenic oil plasticizer | Nynas Naphthenics AB (Stockholm, Sweden) |
| K15 | Hollow glassbubbles | 3M |
| Surfactant | Fluoroaliphatic polymer | 3M |
| Aerosil 972 | Hydrophobic fumed silica | Evonik |

Example 1

A layer of a first skin adhesive SA-1 (60 g/m$^2$) was applied onto the surface of the Acrylic Foam Core AF-1 followed by e-beam radiation through said skin layer. The skin layer SA-1 was applied onto the Foam Core AF-1 by directly hot melt coating onto the acrylic foam core via an extruder and a rotary rod die as the coating station. The second skin adhesive SA-2 (=E2-Film) was laminated against the opposite side of the Acrylic Foam Core AF-1 of that construction mentioned above. The SA-2 was a heat activatable adhesive layer that was non-tacky at room temperature.

The so obtained adhesive tape was laminated to a rubber seal with the SA-2 side against the rubber by applying heat and pressure as follows:
Tape temp. (E2 film)=160° C.
Rubber surface temp=180° C.

The rubber seal used was a rubber seal commercially available from GTG Gummitechnik Wolfgang Bartelt GmbH & Co. KG, Germany under part number G1236.

Skin layer SA-1 was a pressure sensitive adhesive layer of the following composition:

TABLE 2

First skin adhesive composition (SA-1)

| Component | Amount in weight percent |
|---|---|
| PASBC* | 31.19 |
| Kraton 1161D | 13.37 |
| Regalite R1125 | 30.91 |
| Cumar 130 | 10.30 |
| Nyplast 222B | 7.20 |
| Irganox 1010 | 1.34 |

TABLE 2-continued

First skin adhesive composition (SA-1)

| Component | Amount in weight percent |
|---|---|
| Tinuvin 328 | 1.34 |
| 4900 CMB | 0.38 |
| Acrylic Polymer AP-1 | 4 |

* Polymodal, asymmetric star block copolymer was prepared according to U.S. Pat. No. 5,393,373. The polymer had number average molecular weights of about 4,000 Dalton and about 21,500 Dalton for the two end blocks, 127,000-147,000 Dalton for the arm, and about 1,100,000 Dalton for the star measured by SEC (size exclusion chromatography) calibrated using polystyrene standards. The polystyrene content was between 9.5 and 11.5 percent by weight. The mole percentage of high molecular weight arms was estimated to be about 30%.

Acrylic polymer AP-1 was a polymer obtained from polymerization of 45 parts IO, 45 parts BA, 10 parts AA, 0.15 parts IRGACURE™ 651 and 0.06 parts IOTG using ultraviolet radiation to cause polymerization as described in U.S. Pat. No. 5,804,610.

The acrylic foam core AF-1 was made as follows. Into a mixture of the photopolymerizable monomers (IOA and AA) was stirred 0.04% by weight of 2,2-dimethoxy-2-phenyl acetophenone (obtainable as "Irgacure" 651). This was partially polymerized to provide a syrup of about 3000 cps in viscosity by exposure to ultraviolet radiation. To the syrup was added 0.20% by weight of additional "Irgacure" 651 and crosslinking agent HDDA. To this prepolymer mixture the fillers Aerosil™ 972 (2.7%) and glass bubbles (5.8%) were added and slowly mixed using a motorized stirrer equipped with an air motor. After degassing and the addition of surfactant and pigments (0.3%) the mixture was transferred to a frother. While nitrogen gas was fed into the frother, the frothed syrup was delivered through a tube to a knife coater between a pair of transparent, biaxially-oriented polyethylene terephthalate films, the facing surfaces of which had low-adhesion coatings.

The composite emerging from the knife coater was irradiated with a bank of fluorescent black light bulbs to complete the polymerisation to a pressure sensitive adhesive foam layer. The PET process liners were then stripped off and a double sided siliconized release paper liner was laminated to one of the two acrylic foam tape surfaces to allow for the roll winding. The Acrylic Foam Core had a density of 665 kg/m$^3$.

Example 2

A three-layer adhesive tape was obtained by co-extruding a first skin adhesive layer SA-1 (90 µm thick) having the composition as described above, a foam core layer FC-1 as the middle layer and a second skin adhesive layer SA-3 (75 µm thick), followed be e-beam radiation curing. E-beam curing was carried out at opposite sides of the three-layer adhesive tape with an acceleration voltage on the side having the SA-1 skin adhesive of 240 keV and a dose of 9 MRad. The same dose was used at the opposite side but with an acceleration voltage of 255 keV.

Against skin adhesive layer SA-3 was then laminated a heat activatable adhesive layer of the same composition as SA-2 in example 1.

The so obtained adhesive tape was laminated to a rubber seal with the SA-2 side against the rubber by applying heat and pressure as follows:
Tape temp. (E2 film)=160° C.
Rubber surface temp=180° C.
The rubber seal used was the same as used in Example 1.

The SA-3 adhesive layer contained 12.70% by weight of the polymodal, asymmetric star block copolymer (PASBC); 53.10% (by weight) of AP-I; 23.30% of tackifying resin (ESCOREZ 1310LC); 3.80% by weight of tackifying resin (SUPERESTER W1 15; 6.20% by weight of plasticizer (SANTICIZER 141); 0.26% by weight of antioxidant (IRGANOX 1010); 0.25% by weight of ultraviolet light absorber (TINUVIN 328) and 0.38% by weight of CMB 4900.

The foam core FC-1 had the following composition

TABLE 4

Foam core composition FC-1 and properties

| Comp. Parts By Weigh Percent (%) AP-3 | Components Parts By Weigh Percent (%) AP-2 | Components Parts By Weigh Percent (%) Microspheres | Components Parts By Weigh Percent (%) Pigment | Fumed Silica | Foam Densitiy (kg/m$^3$) | Thickness (mm) |
|---|---|---|---|---|---|---|
| 85.82 | 9.60 | 3.70 | 0.38 | 0.70 | 608 | 980 |

Acrylic Polymer 2 (AP-2) in table 4 was obtained by polymerization of 85 parts of 2-EHA; 15 parts of AA; 0.15 parts of IRGACURE™ 651; and 0.8 part IOTG. Similarly, Acrylic Polymer 3 (AP-3) was obtained by polymerization of 90 parts of 2-EHA; 10 parts of AA; 0.15 part IRGACURE™ 651; and 0.03 part of IOTG.

Each of examples 1 and 2 were tested as described above. The results obtained were as follows:

TABLE 5

Test results

| Example | % Elongation | Extension 24 h (mm) | Extension 72 h (mm) | Extension cycle test (mm) |
|---|---|---|---|---|
| 1 | 1 | 0 | 0 | 0[1] |
| 1 | About 3 | 0 | 0 | 3[2] |
| 1 | About 2 | 0 | 0 | 2.5[1] |
| 2 | About 3 | 0 | 0 | 3.5[2] |

[1] no debonding observed along the radius of the curve
[2] slight areas of partial debonding observed

The invention claimed is:

1. A method of attaching an elongate strip to a door frame of the body of a vehicle, the method comprising application of the elongate strip by means of a device comprising:
   (i) a drive means;
   (ii) an application head;
   (iii) a stress control unit positioned between the drive means and application head and comprising one or more sensor units;
   (iv) and a control unit for controlling the drive means,
the application of the elongate strip comprising advancing the elongate strip by the drive means, positioning, pressing and/or rolling the elongate strip on the door frame by means of the application head and controlling stress of the elongate strip by means of the stress control unit and the control unit for controlling the drive means, whereby the one or more sensor units of the stress control unit measure the stress of the elongate strip and the control unit controls the drive means to maintain the stress of the elongate strip within a desired range of stress based on the measurement of the stress of the elongate strip by the one or more sensors of the stress control unit,
wherein the elongate strip comprises a rubber gasket and an adhesive tape comprising a foam layer having first and second major sides, a pressure sensitive adhesive layer associated with a first major side of the foam layer, the pressure sensitive adhesive comprising a cross-linked rubber and the foam layer comprises an acrylic polymer of one or more alkyl acrylates having an average of 3 to 14 carbon atoms in the alkyl group, and a second major side has a further adhesive layer associated with it, the foam layer having a density of at least 540 kg/m$^3$ and less than or equal to 608 kg/m$^3$, and wherein said rubber gasket is attached to said adhesive tape through said further adhesive layer.

2. The method of claim 1 wherein the control unit for controlling the drive means controls the drive means so as to maintain the level of elongation of the elongate strip between 0 and 3%.

3. The method of claim 2 wherein the acrylic polymer is a polymer obtainable by polymerization of a polymerizable composition comprising one or more alkyl acrylates having an average of 3 to 14 carbon atoms in the alkyl group and one or more polar monomers and optionally one or more multifunctional monomers having at least two free radical polymerizable groups.

4. The method of claim 1 wherein the acrylic polymer is a polymer obtainable by polymerization of a polymerizable composition comprising one or more alkyl acrylates having an average of 3 to 14 carbon atoms in the alkyl group and one or more polar monomers and optionally one or more multifunctional monomers having at least two free radical polymerizable groups.

5. The method of claim 1 wherein the foam layer further comprises a thixotropic agent.

6. The method of claim 1 wherein said pressure sensitive adhesive layer comprises an acrylic pressure sensitive adhesive component.

7. The method of claim 1 wherein said acrylic pressure sensitive adhesive component comprises an acrylic polymer having repeating units derived from one or more alkyl acrylates having 3 to 14 carbon atoms in the alkyl group and one or more polar monomers.

8. The method of claim 1 wherein the cross-linked rubber comprises a cross-linked block copolymer having a rubbery block and a glassy block.

9. The method of claim 1 wherein said further adhesive layer comprises a pressure sensitive adhesive component or a heat activatable adhesive component.

10. The method of claim 1, wherein the elongate strip includes machine readable data and wherein the device further includes means for reading the machine readable data and whereby the desired stress range is set based on the readout of the machine readable data.

11. The method of claim 1 wherein the density of the foam layer is at least 570 kg/m$^3$.

12. The method of claim 1, wherein the drive means is a belt drive means.

13. The method of claim 12, wherein the drive means comprises two drive means arranged on opposite sides of the elongate strip.

14. The method of claim 13, wherein the application head is a pin roller.

15. The method of claim 12, wherein the application head is a pin roller.

16. The method of claim 1, wherein the application head is a pin roller.

* * * * *